(12) United States Patent
Meunier et al.

(10) Patent No.: US 8,280,622 B2
(45) Date of Patent: Oct. 2, 2012

(54) TERRAIN AVOIDANCE SYSTEM FOR TRANSPORT AIRCRAFT

(75) Inventors: Hugues Meunier, Frouzins (FR); Nicolas Marty, Castelginest (FR)

(73) Assignee: Thales, Neuilly sur Seine (FR)

( * ) Notice: Subject to any disclaimer, the term of this patent is extended or adjusted under 35 U.S.C. 154(b) by 1150 days.

(21) Appl. No.: 12/092,798

(22) PCT Filed: Oct. 31, 2006

(86) PCT No.: PCT/EP2006/067954
§ 371 (c)(1),
(2), (4) Date: May 6, 2008

(87) PCT Pub. No.: WO2007/054448
PCT Pub. Date: May 18, 2007

(65) Prior Publication Data
US 2008/0288169 A1    Nov. 20, 2008

(30) Foreign Application Priority Data
Nov. 10, 2005 (FR) ...................... 05 11457

(51) Int. Cl.
*G06G 7/78* (2006.01)
(52) U.S. Cl. ................... 701/301; 701/1; 701/3; 701/8; 701/9; 701/14; 340/945; 340/964
(58) Field of Classification Search ................ 701/1, 3, 701/8, 9, 14, 301; 340/945, 964
See application file for complete search history.

(56) References Cited

U.S. PATENT DOCUMENTS

| 4,924,401 A | 5/1990 | Bice et al. |
| 5,414,631 A | 5/1995 | Denoize et al. |
| 5,488,563 A | 1/1996 | Chazelle et al. |
| 5,638,282 A | 6/1997 | Chazelle et al. |
| 5,677,842 A | 10/1997 | Denoize et al. |
| 5,864,307 A * | 1/1999 | Henley .......................... 340/964 |
| 5,892,462 A | 4/1999 | Tran |
| 6,021,374 A * | 2/2000 | Wood ............................. 701/301 |
| 6,088,654 A * | 7/2000 | Lepere et al. ................. 701/301 |
| 6,317,663 B1 | 11/2001 | Meunier et al. |
| 6,480,120 B1 | 11/2002 | Meunier |
| 6,583,733 B2 * | 6/2003 | Ishihara et al. .............. 340/946 |
| 6,675,076 B1 | 1/2004 | Moody |
| 6,906,641 B2 * | 6/2005 | Ishihara ....................... 340/946 |
| 7,064,680 B2 * | 6/2006 | Reynolds et al. ............. 340/961 |
| 7,337,043 B2 * | 2/2008 | Bull ................................. 701/1 |

(Continued)

FOREIGN PATENT DOCUMENTS
EP    1517211    3/2005
(Continued)

*Primary Examiner* — Khoi Tran
*Assistant Examiner* — Jonathan L Sample
(74) *Attorney, Agent, or Firm* — Lowe, Hauptman, Ham & Berner, LLP (57) ABSTRACT

A system indicating to a pilot that an aircraft has passed the limit-point of success of a standard vertical avoidance maneuver is disclosed. To determine the limit-point, the system monitors a penetration of a model of the terrain being flown over into a first protection volume linked to the aircraft and configured so as to model a standard vertical avoidance maneuver path executed without delay. To determine disengagement azimuth sectors, the system monitors the penetrations of the model of the terrain being flown over into a second protection volume with large azimuth aperture, linked to the aircraft and configured so as to contain the limit-point protection volume and, for the various azimuths covered, paths of a composite maneuver beginning with change-of-heading maneuvers with which to reach the azimuth concerned and continuing with the standard terrain vertical avoidance maneuver.

11 Claims, 7 Drawing Sheets

U.S. PATENT DOCUMENTS

| | | | |
|---|---|---|---|
| 7,675,461 B1 * | 3/2010 | McCusker et al. | 342/179 |
| 8,032,266 B2 * | 10/2011 | Bitar et al. | 701/3 |
| 2002/0036574 A1 * | 3/2002 | Ishihara | 340/945 |
| 2002/0080145 A1 * | 6/2002 | Ishihara | 345/589 |
| 2002/0099478 A1 * | 7/2002 | Ishihara et al. | 701/9 |
| 2004/0181318 A1 * | 9/2004 | Redmond et al. | 701/9 |
| 2006/0097895 A1 * | 5/2006 | Reynolds et al. | 340/961 |
| 2008/0288169 A1 * | 11/2008 | Meunier et al. | 701/301 |

FOREIGN PATENT DOCUMENTS

| | | |
|---|---|---|
| FR | 2689668 | 10/1993 |
| FR | 2773609 | 7/1999 |
| FR | 2813963 | 3/2002 |
| FR | 2842594 | 1/2004 |
| FR | 2848661 | 6/2004 |
| FR | 2860292 | 4/2005 |
| FR | 2864270 | 6/2005 |
| FR | 2864312 | 6/2005 |
| FR | 2867851 | 9/2005 |
| FR | 2868835 | 10/2005 |
| FR | 2871878 | 12/2005 |
| GB | 2310184 | 8/1997 |
| WO | WO9804883 | 2/1998 |

* cited by examiner

TERRAIN AVOIDANCE SYSTEM FOR TRANSPORT AIRCRAFT

CROSS-REFERENCE TO RELATED APPLICATIONS

The present Application is based on International Application No. PCT/EP2006/067954, filed on Oct. 31, 2006, which in turn corresponds to French Application No. 05 11457, filed on Nov. 10, 2005 and priority is hereby claimed under 35 USC §119 based on these applications. Each of these applications are hereby incorporated by reference in their entirety into the present application.

FIELD OF THE INVENTION

The present invention relates to the prevention of aeronautical accidents in which an aircraft that is still maneuverable crashes into the ground, even, where appropriate, despite prior alerts and alarms.

BACKGROUND OF THE INVENTION

This type of accident is known in the technical literature by the acronym CFIT, standing for "Controlled Flight Into Terrain". Although it used to represent a major proportion of air disasters, CFIT-type accidents are now mostly avoided, thanks to terrain avoidance maneuvers performed by the air crews, urged by alerts and alarms originating from onboard automatic collision risk signaling systems, TAWS (Terrain Awareness & Alerting Systems), which include the GCAS system (Ground Collision Avoidance System) and the $T^2CAS$ system (Terrain & Traffic Collision Avoidance System), developed and marketed by Thales.

The instruction given to an air crew confronted with a risk of collision with the terrain is to engage an avoidance maneuver in accordance with a predefined avoidance procedure which corresponds to a pure vertical avoidance maneuver, called "Pull-Up", consisting of a full-throttle climb preceded by a leveling of the wings if the aircraft was turning. This maneuver, called "standard avoidance maneuver" or "SVRMB", ("Standard Vertical Recovery Maneuver Boundary"), is independent of the aircraft type and of its instantaneous climbing capabilities. However, for the instruction to be effective, the standard avoidance maneuver still needs to be undertaken in time.

Onboard equipment that automatically signals flight situations leading to risks of collision with the terrain, sufficiently in advance for an actual vertical avoidance maneuver to be effective, have been developed in recent years. Among such equipment, the TAWS systems are the most efficient because they use a function FLTA (Forward-Looking Terrain Avoidance) which looks, in front of the aircraft, along and below its path vertically and laterally, to see if there is a potential risk of collision with the terrain.

The principle of the TAWS systems is based on monitoring the penetration of the terrain into one or more protection volumes linked to the aircraft based on a modeling of the terrain being flown over. The reliefs of the region being flown over are listed in a digital map that can be accessed on the aircraft. The position of the aircraft in relation to the region being flown over is supplied by flight equipment such as: inertial unit, satellite positioning receiver, baro-altimeter, radio-altimeter or a combination of several of these sensors. The protection volumes linked to the aircraft are advantageously defined to contain a modeling of the standard vertical avoidance maneuver path engaged in the more or less short term from the path followed by the aircraft predicted from flight parameters delivered by the aircraft flight equipment, assuming that the aircraft maintains its ground speed vector or its path. There are normally two of the protection volumes linked to the aircraft, of graduated sizes, the most forward one being used to give an alert indicating to the crew of the aircraft that the path being followed must be modified in the short term to avoid the terrain, and the nearer one being used to give an alarm indicating to the crew of the aircraft that it must actually, as an emergency, undertake a vertical avoidance maneuver.

Most of the onboard TAWS systems deliver, in addition to audible alerts and alarms intended to attract the attention of the crew of an aircraft to the need to modify the path being followed in the more or less short term, a cartographic representation on screen of the reliefs appearing in front and to the sides of the aircraft, from a subdivision of the terrain being flown over into various strata distinguishing between reliefs that are not threatening because they are well below the flight altitude range of the aircraft, the reliefs to be taken into consideration because they fall within the flight altitude range of the aircraft and the reliefs that are very threatening because they are above the flight altitude range of the aircraft. This on-screen cartographic representation of the threatening reliefs gives a good overview of the surrounding situation in a normal flight but it is not detailed enough to enable a crew to devise a relief avoidance path in the case of an alert, and even more so of an alarm regarding a risk of collision with the ground.

For more details on the concepts involved in the TAWS systems, the reader can profitably refer to the US patents U.S. Pat. Nos. 5,488,563, 5,414,631, 5,638,282, 5,677,842, 6,088,654, 6,317,663, 6,480,120 and to the French patent applications FR 2.813.963, FR 2.842.594, FR 2.848661, FR 2.860.292, FR 2.864.270, FR 2.864.312, FR 2.867.851, FR 2.868.835.

However, in some situations a standard vertical avoidance maneuver is insufficient to avoid a collision with the terrain and a more sophisticated avoidance maneuver with change of heading, hereinafter called lateral avoidance maneuver must be envisaged. Typically, such situations are encountered when the aircraft is turning along major relief, or even when it is directed in a straight line towards reliefs, particularly higher reliefs, that cannot be crossed given its climb capability. Some operational TAWS systems, including those developed by Thales, signal these particular situations with a specific "Avoid Terrain" alarm. However, they give no indication as to the path of the avoidance maneuver to be followed in such situations.

There is therefore a need in the operational TAWS systems to accompany "Avoid Terrain" type alarms with one or more complementary indications to help the crew choose a lateral avoidance path that is safe, appropriate to the hazardous situation causing the generation of an "Avoid terrain" alarm. More generally, indications on the path of the appropriate avoidance maneuver or on the sector of the space in which this path must be contained would be very useful with this type of alarm.

Moreover, since the crew can sometimes be in situations where it is not fully aware of the imminence of the danger or where it delays the avoidance maneuver, it is also desirable to be able to go beyond complementary indications as to the lateral avoidance path to be followed to an automation of the process of following this lateral avoidance path with or without supply of these complementary indications.

It should be noted that there are terrain-following systems that are operational onboard certain combat airplanes which, by automatic maneuvers, keep the airplane at a constant height above the ground despite the terrain accidents and which, because of this, perform automatic terrain avoidance maneuvers if the airplane comes too close to the relief. However, these onboard terrain-following systems are designed on the basis of very frequent terrain-hugging maneuvers and are not suited to aircraft such as transport airplanes, civilian or military, helicopters, or even drones in certain uses, most of whose missions are to follow programmed paths, manually or automatically, by means of a flight management computer FMS or an automatic pilot PA, as far as possible avoiding any significant unplanned alteration of these paths, except to avoid a collision with the terrain. For such aircraft, terrain avoidance maneuvers must be triggered as infrequently as possible to reduce the fatigue forces on the cell and to respect the comfort of the passengers.

As described in the American patent U.S. Pat. No. 4,924, 401, there is also a ground collision prevention system, onboard and operational on combat airplanes but of a type that is different from a TAWS system because it takes account only of the flight parameters of the aircraft, which automatically undertakes standard, purely vertical, terrain avoidance maneuvers.

There are also automatic pilots for aircraft which, on command from a terrain collision prevention device, undertake to automatically follow a standard, purely vertical, terrain avoidance maneuver, by overriding the manual flight controls, which can be overridden by the pilot as described in the American patent U.S. Pat. No. 6,675,076 or which is imposed in an authoritarian way as described in the European patent application EP 1.517.211.

Also known, from patent U.S. Pat. No. 5,892,462, is a TAWS system that uses a modeling of the behavior of the aircraft to create a protection volume linked to the aircraft and to plot avoidance paths that are practicable for the aircraft. The protection volume surrounds an extrapolation of the current path of the aircraft extended by a climb path prediction. Its penetration by the terrain is likened to a risk of collision with the terrain. In the case of an established risk of collision with the terrain, the system works back step by step along the current path extrapolation to determine the limit-point of the path of the aircraft as far as where a purely vertical standard avoidance maneuver can be applied with success. When the limit-point is passed or can no longer be determined, the system initiates a search for a practicable lateral avoidance path by an angular sweep of the terrain profiles, either side of the current path of the aircraft.

This TAWS system gives an alert when the limit-point for application of a standard vertical avoidance maneuver is passed and generates an alarm when it appears that it will no longer be possible to find a lateral avoidance path. It addresses the concerns of better assistance to a crew confronted with the need to execute a lateral avoidance maneuver because it is also capable of acting on the flight director to guide the pilot in following a lateral avoidance path or on the automatic pilot to execute a lateral avoidance path. This system, which appears not to be operational at the present time, presents the drawback of using a modeling of the dynamic behavior of the aircraft which is complex to perform and which raises significant certification problems with a view to operational implementation because the level of accuracy of this behavioral modeling affects the dependability of the TAWS system itself.

SUMMARY OF THE INVENTION

An object of the present invention is a system onboard aircraft, for the prevention of ground collisions, of TAWS type, providing the crew of an aircraft with assistance in determining and/or following an effective lateral terrain avoidance path in case of established risk of collision with the ground, without using a powerful modeling of the behavior of the aircraft.

Another object of the present invention is a TAWS system supplying assistance in determining and/or following a lateral terrain avoidance path which can be obtained by a simple upgrading of existing TAWS systems.

The present invention is directed to a system onboard an aircraft, for preventing collisions with the terrain likening a risk of collision with the terrain after a predetermined forecast delay to the penetration of a cartographic representation of the terrain being flown over, stored in a database accessible to the aircraft, into a protection volume linked to the aircraft located relative to the terrain being flown over by means of onboard locating equipment, oriented in the direction of progress of the aircraft and configured so as to model a standard terrain vertical avoidance maneuver path engaged over the forecast delay based on the path followed by the aircraft predicted from flight information delivered by aircraft flight equipment, assuming that the aircraft maintains its current speed vector with the same trend, if it is in the process of changing.

This system of preventing collisions with the terrain comprises:
  means for detecting the limit-point of success of a standard terrain vertical avoidance maneuver likening the crossing of this limit-point by the aircraft to the penetration of the terrain into a protection volume linked to the aircraft and configured so as to model a standard vertical avoidance maneuver path executed without delay, said path being predefined according to the aircraft type,
  means for determining azimuth disengagement sectors, either side of the direction of progress of the aircraft, suitable for the success of a standard terrain vertical avoidance maneuver likening the azimuth disengagement sectors to the azimuth sectors free of penetration of the terrain into a protection volume with large azimuth aperture, linked to the aircraft and configured so as to contain the limit-point protection volume and, for the various azimuths covered, paths of a composite maneuver beginning with change-of-heading maneuvers with which to reach the azimuth concerned and continuing with the standard terrain vertical avoidance maneuver, said paths being, over their parts corresponding to the standard vertical avoidance maneuver, predefined according to the aircraft type,
  means for signaling the crossing of the limit-point of success of the standard terrain vertical avoidance maneuver, and
  means for signaling azimuth disengagement sectors.

Advantageously, a predefined path corresponding to a standard vertical avoidance maneuver is also dependent on the weight of the aircraft.

Advantageously, a predefined path corresponding to a standard vertical avoidance maneuver is also dependent on the inertia of the aircraft.

Advantageously, a predefined path corresponding to a standard vertical avoidance maneuver is also dependent on the instantaneous configuration of the aircraft.

Advantageously, the system for preventing collisions with the terrain also comprises means for signaling a composite terrain avoidance maneuver with minimal change of heading.

Advantageously, the system for preventing collisions with the terrain also comprises means for guiding the crew of the aircraft in executing a composite terrain avoidance maneuver.

Advantageously, the system for preventing collisions with the terrain also comprises means for automatically executing a composite terrain avoidance maneuver directly affecting the flight equipment of the aircraft.

Advantageously, the system for preventing collisions with the terrain also comprises means for alerting to a medium-term risk of collision with the terrain involving, to be resolved, a change of path of the aircraft, on the part of the crew, likening a collision with the terrain to the penetration of the terrain into an alert protection volume linked to the aircraft modeling a predefined standard vertical avoidance maneuver path engaged in the medium term.

Advantageously, the system for preventing collisions with the terrain also comprises means for raising an alarm concerning a short-term risk of collision with the terrain likening a short-term collision with the terrain to the penetration of the terrain into an alarm protection volume linked to the aircraft modeling a predefined standard vertical avoidance maneuver path engaged in the short term.

Advantageously, when the system for preventing collisions with the terrain comprises alert and alarm means concerning the medium- and short-term risk of collision with the terrain, it creates a protection volume to determine disengagement sectors and alert and alarm protection volumes modeling predefined standard avoidance maneuver paths of different types, the predefined path modeled in the protection volume to determine disengagement sectors having a climb gradient greater than the predefined paths modeled in the alert and alarm protection volumes.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE PREFERRED EMBODIMENT

The system for preventing collisions with the terrain of TAWS type which will be described is based on the one hand on an a priori knowledge of the paths corresponding to the standard vertical terrain avoidance maneuvers recommended to the pilot of an aircraft, and on the other hand, on the currently well controlled forecast, over a short term, of the order of a few minutes, of the path followed by an aircraft, made on the basis of the characteristics of and, where appropriate, changes to the speed vector of the aircraft, to supply the pilot with an indication concerning one or more effective avoidance paths with or without an automatic engagement of an avoidance maneuver if there is an imminent risk of conflict with the terrain.

The a priori knowledge of the path corresponding to a standard vertical avoidance maneuver is taken from a behavioral study of the type of aircraft concerned which makes it possible to predetermine various forms of vertical avoidance path taking into account the instantaneous climb capabilities of the aircraft, based on parameters such as the weight of the aircraft and/or its inertia and/or its speed on engaging the maneuver, and/or its configuration at the time: loss of an engine, position of the flaps, leading edges, de-icing systems, aerodynamic brakes, rate of turn, roll, roll speed, etc. The various predetermined forms of the path followed during a standard vertical avoidance maneuver or the climb capability data of the aircraft from which they devolve can, for example, be stored in an onboard database and selected from parameter values such as the weight and/or inertia of the aircraft delivered by the flight instruments, as well as other configuration parameters.

To fulfill its functions, this TAWS-type system likens the risks of collision with the terrain to the penetration of a model of the terrain being flown over, generated from a cartographic database, into one or more protection volumes linked to the aircraft modeling standard vertical avoidance maneuver paths engaged in the more or less short term.

The protection volumes extend in front of the aircraft, in its direction of progress with bottom and front surfaces with paddle-shaped longitudinal profiles corresponding to a predetermined standard avoidance maneuver path engaged in the more or less short term from an extrapolation of the path of the aircraft deduced from the characteristics and, where appropriate, from the variations of its speed vector. They are called "feelers" because they are mainly defined by their bottom and front surfaces since the aim is to detect penetration of the terrain being flown over.

More specifically, the TAWS-type system that will be described implements:
- a first limit-point feeler to detect a risk of collision with the terrain which cannot be simply eluded by a standard vertical avoidance maneuver and, where appropriate, signal it to the pilot of the aircraft by oral or visual indications,
- a second feeler for analyzing the escape possibilities offered by the surroundings of the aircraft to determine the azimuth sectors open to a standard vertical avoidance maneuver preceded by a change of heading called composite avoidance maneuver and signal these sectors to the pilot (for example by means of trend bars appearing on a screen displaying the primary flight parameters) if a reaction is required on his part to avoid the collision with the terrain, third and fourth feelers of graduated lengths, constructed around standard vertical avoidance maneuvers engaged later than for the first and second feelers, and conventionally used to trigger earlier alerts and alarms, the alerts signaling the need to correct, in the short term, the path followed by the aircraft, and the others, the alarms, signaling the need to immediately engage a standard vertical avoidance maneuver, a fifth feeler constructed about a standard avoidance maneuver engaged, while resolving an established risk of ground collision, on a path following the orientation of the path followed initially on detection of the established risk of collision with the ground and used to detect the end of resolution of an established risk of collision with the ground, a logic controller which, optionally, supplies commands (gradient and heading) to an automatic pilot to execute a standard or composite terrain avoidance maneuver just before reaching the limit-point of loss of effectiveness of the standard vertical avoidance maneuvers and which can be taken out of play by disengaging the automatic pilot, the pilot retaining full authority over the flight controls, a signaling device supplying the various oral or visual indications characterizing the trend of a risk of collision with the terrain, including the early alerts and alarms concerning risk of collision with the terrain, the alarm indicating passing of the limit-point of effectiveness of the standard vertical avoidance maneuvers, the azimuth sectors still open to a standard vertical avoidance maneuver after passing the limit-point, the assured resolution of an established risk of collision with the ground taking into account the path of the avoidance maneuver undertaken, the end of the resolution of an established risk of collision with the ground and the actual disappearance of an established risk of collision with the ground, and a device for disabling these mechanisms in "nominal" approaches to a runway.

It should be noted that the third, fourth and fifth feelers are not essential to the implementation of the invention.

The point from which the path followed presents risks of collision with the terrain such that it is no longer possible to perform a standard vertical avoidance maneuver generally follows two successive points in the path followed by an aircraft signaled by the operational TAWS systems:

a first alert point from which a risk of conflict with the terrain is detected and merits being signaled to the pilot for him to adjust his path. At this point, a TAWS-type system issues an oral alert of "Caution" type.

a second alarm point from which the risk of conflict with the terrain is such that a standard vertical avoidance maneuver must immediately be undertaken by the pilot. At this second point, a TAWS-type system issues an oral alarm of "Pull Up" type.

It should be noted that, in certain situations, the path followed by an aircraft directly leads the aircraft from the first alert point to the imminent conflict limit-point without first passing through the second alarm point. It should also be noted that, in certain variants of the invention, the system may not generate these alerts.

Determining the crossing by the aircraft of the limit-point of imminent conflict with the terrain from which a standard vertical terrain avoidance maneuver is no longer effective is likened to the penetration of a topographic representation of the terrain generated from a terrain elevation database that is onboard or that can be accessed from the aircraft, in a limit-point feeler which corresponds to the bottom and front surface of a protection volume linked to the aircraft modeling a path of a standard vertical avoidance maneuver engaged at once or almost at once, after a time below which the pilot has practically no more time to react, of predetermined duration typically between 0 and 3 seconds, generally constant but with the option to be variable and depend on the criteria relating to the nature of the flight phase, the altitude of the aircraft or other factors.

Figure 1:
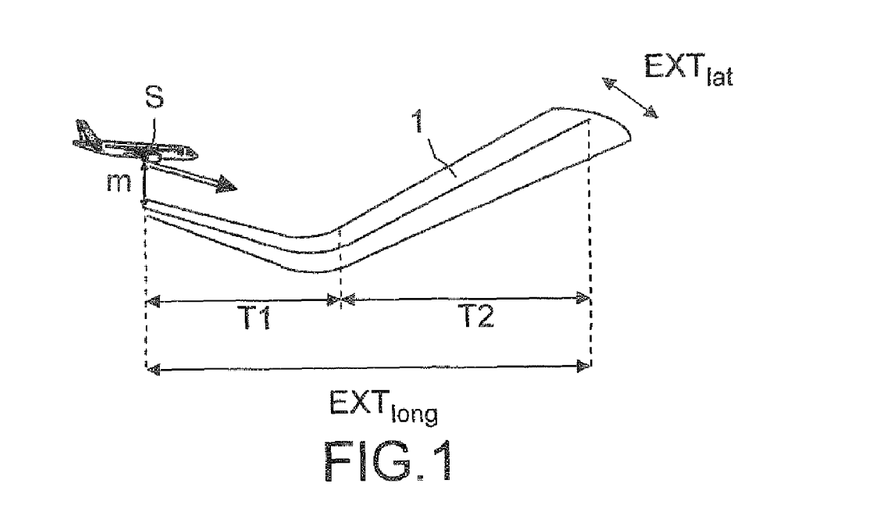
FIG. 1 illustrates the form of a feeler following the shape of the bottom and front surface of a protection volume linked to the aircraft and used to detect the crossing of the limit-point of success of a standard vertical avoidance maneuver.

As FIG. 1 shows, the limit-point feeler 1 presents a longitudinal extension $EXT_{long}$ in the direction of movement of the aircraft and a lateral extension $EXT_{lat}$ transversal to the movement of the aircraft. Its longitudinal extension $EXT_{long}$ has a profile corresponding to an extrapolated path comprising two successive flight portions or times:

a first flight time T1 corresponding to an initialization of a standard vertical avoidance maneuver going from the current position S of the aircraft to a leveling-off prior to actually placing the aircraft in a climb corresponding to a reaction time of a pilot having decided on a standard vertical avoidance maneuver augmented by the times to level off the aircraft, take an angle of attack suited to a climb gradient equal to or close to a maximum possible and switch engines to a maximum thrust mode. This first part takes around 10 or so seconds, and a second flight time T2 corresponding to a climb with a gradient equal or close to the maximum.

The form and the time it takes to travel the path of the first part T1, and the climb gradient of the second part T2, are given by tables taking account of parameters such as the aircraft type, its weight, its speed, its rate of turn and its roll angle, its roll speed or other parameters.

The longitudinal extension $EXT_{long}$ of the limit-point feeler 1 typically covers two minutes of flight, but can be adjusted according to the flight phase or the area in which the flight is taking place. For example, in a mountainous airport zone, it can be adjusted according to the aircraft-runway distance obtained by the use of data contained in a database of airport runway coordinates.

The lateral extension $EXT_{lat}$ of the limit-point feeler 1 takes account of aircraft location uncertainties due to the imprecisions of its onboard locating instruments and the topographic representation of the terrain generated from the terrain elevation database. It increases with the forecast delay. The width of the feeler level with the current position of the aircraft is a predetermined value, typically 100 m for example. For a given implementation, this width is normally constant. However, in certain implementations, this width can have a variable value dependent on criteria such as the navigation accuracy level, flight phase, altitude or other factors. From the current position of the aircraft, the feeler opens typically by 1.5° either side of the direction of movement of the aircraft when it is flying in a straight line and up to a value such as 90° for example on the side of the turn when it is turning, according to the rate of turn. On the other side of the turn, the angle can remain unchanged because, if it becomes necessary to execute an avoidance maneuver, the zone used for this maneuver should remain protected.

To detect a penetration of the terrain being flown over through the limit-point feeler 1, account is taken of a vertical safety margin m which is either added to the modeling of the terrain taken into account or, as here, subtracted from the altitude of the aircraft, lowering the limit-point feeler 1 by so much relative to the modeling of the terrain taken into account. This safety margin under the current position of the airplane and/or under the path followed by the aircraft here corresponds to the minimum margin that is acceptable to avoid an accident. Its value is between, for example 0 and 100 feet, but it can be a little greater. The maximum value must take into account, as already described in the U.S. Pat. Nos. 5,488,563 and 5,638,282, the various errors impacting on the actual height above the real ground, including: accuracy of the terrain database, accuracy of the vertical position of the airplane given by the onboard equipment, minimum margin for avoiding the usual obstacles such as: trees, common buildings, etc. (these are typically less than 100 feet). More generally, this safety margin is at most equal to the margin used by the feelers used by the TAWS-type systems for "caution" type alerts and "warning" type alarms.

For more details on the configuration of a limit-point feeler 1, reference can be made to the French patent application FR 2.864270 filed by the applicant.

A penetration of the terrain being flown over into the limit-point feeler 1 is detected:

by positioning the limit-point feeler 1 relative to the topographic representation of the terrain being flown over on the one hand laterally from information on the geographic position of the aircraft and on its direction of movement (route) delivered by its onboard instruments and, on the other hand, vertically taking into account the vertical safety margin based on altitude information delivered by the instruments onboard the aircraft, and by searching for the points of the limit-point feeler 1 that penetrate the topographic representation of the terrain being flown over, for example by sampling the limit-point feeler by the geographic locating grid used by default in the terrain elevation database to criss-cross the terrain being flown over, or by interpolation between points of the grid.

A detection of penetration of the terrain being flown over into the limit-point feeler 1 indicating the ineffectiveness of the standard vertical terrain avoidance maneuvers is used to inform the pilot of a situation of imminent risk of collision with the ground by oral and/or visual indications (such as, typically, an "Avoid Terrain" type announcement) and to initiate a process to help in resolving the established risk of collision with the terrain.

The avoidance or disengagement azimuth sectors that remain open to a standard vertical avoidance maneuver after a change of heading are identified by analyzing the azimuth sectors free of penetration of the terrain within a dedicated feeler, corresponding to a very great increase in the azimuth aperture of the limit-point feeler. This dedicated feeler corresponds to the bottom and front surfaces of a protection volume modeling not only the path of a standard vertical avoidance maneuver engaged at once or at most in the very short term, but also a set of composite paths comprising a first part corresponding to an initial, more or less pressing, change-of-heading maneuver path, prolonged by a second part corresponding to a standard vertical avoidance maneuver path.

Figure 2:
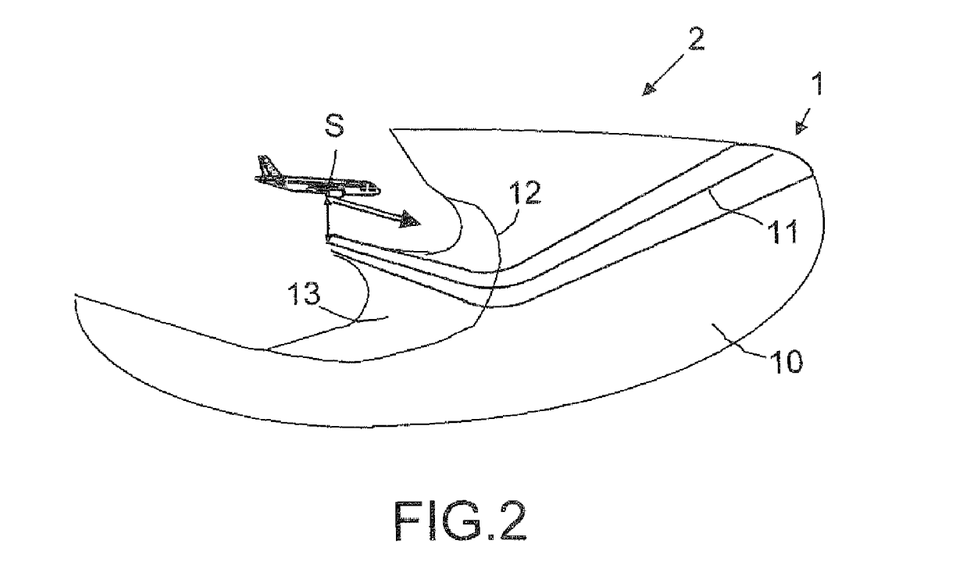
FIG. 2 illustrates the shape of an analysis feeler with wide azimuth aperture used to determine disengagement sectors when a simple standard vertical avoidance maneuver is bound to fail, FIG. 3 gives an example of penetration of the terrain into the analysis feeler illustrated in FIG. 2.

As represented in FIG. 2, the feeler 2 used in analyzing the escape possibilities offered by the surroundings of the aircraft retains the surface of the limit-point feeler 1 complemented by lateral extensions giving it a generally spread form recalling that of a halberd. More specifically, the analysis feeler 2 has a turned-up front surface 10, generated by a directrix 11 having the form of a second part with climb gradient close to the maximum, of a standard vertical avoidance maneuver path relying at its base on a generatrix 12 in an open arc of circle formed by the location of the points of completion of the initial change-of-heading maneuvers within range of the aircraft. This turned-up front surface is prolonged in the direction of the current position S of the aircraft by a sectoral connecting surface 13 containing all the change-of-heading paths within range of the aircraft, limited to a maximum change of heading that can go as far as 180° in order to test the half-turn possibilities.

The location of the points of completion of the change-of-heading maneuvers corresponds to the location of the ends of the chords of the change-of-heading turns. It can be determined from predictions of flat-turn paths, with constant roll angle SIDE_BANK and traveled with a constant air speed TAS, which stops at the moment when the wings of the aircraft level out after the aircraft has reached the desired heading, and whose radius, fixed according to the performance characteristics of the aircraft and a desired degree of comfort, satisfies the conventional relation:

$$R = \frac{TAS^2}{g \times \tan(\text{SIDE\_BANK})}$$

g being the acceleration of gravity.

This location of the points of completion of the change-of-heading maneuvers takes the form of a curved segment resembling an arc of circle that is also open if it is accepted that all the turns are executed with one and the same roll angle and one and the same speed, and have one and the same radius.

As a variant, the analysis feeler 2 may not be situated at the same level as the limit-point feeler 1 in the direction of progress of the aircraft, but come slightly within or beyond the limit-point feeler 1.

Figure 3:
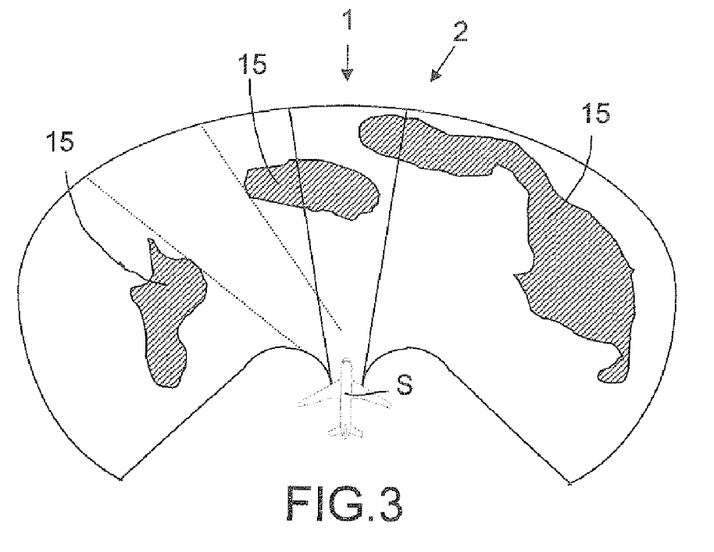
Figure 4:
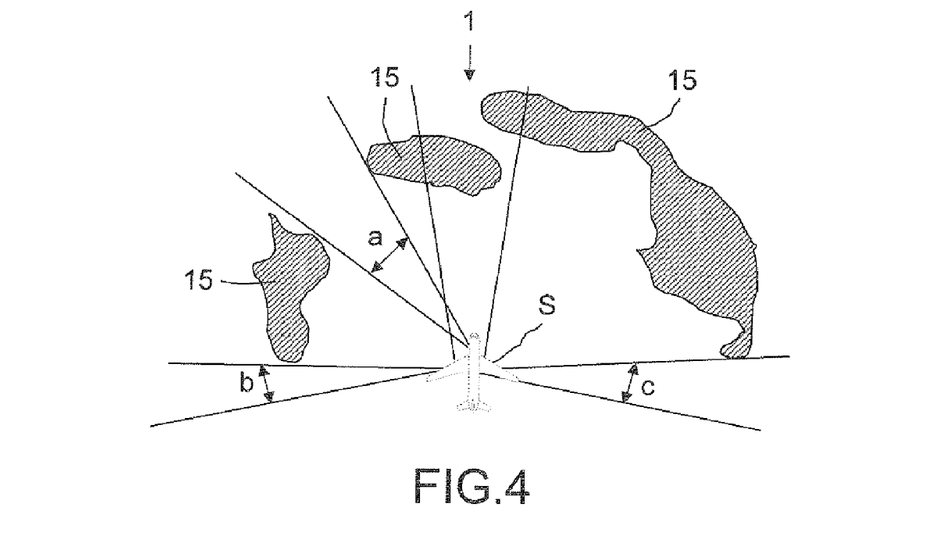
FIG. 4 illustrates a way of determining the possible disengagement azimuth sectors in the example of penetration of the terrain into the analysis feeler shown in FIG. 3, FIGS. 5 and 6 represent, in vertical and horizontal projections, the association of the limit-point and analysis feelers with alert and alarm feelers.

The detection of a penetration of the terrain being flown over into the limit-point feeler 1, signaling an established risk of collision with the terrain that cannot be avoided by a simple vertical avoidance maneuver, leads, as represented in FIG. 3, to an inventory of the points of the terrain being flown over that penetrate into the analysis feeler 2, then, as represented in FIG. 4, a search for the azimuth sectors centered on the current position S of the aircraft that are still open, that is, free of penetration by points of the terrain being flown over.

The inventory of the points 15 of the terrain being flown over penetrating into the analysis feeler 2 is obtained, as for the limit-point feeler 1, by positioning the analysis feeler 2 laterally and vertically relative to the topological representation of the terrain being flown over generated from the terrain elevation database and by comparing, after taking into account the safety altitude margin, the altitudes of the points of the analysis feeler 2 with the elevations of the points with the same geographic coordinates in the topological representation of the terrain being flown over.

The search for the azimuth sectors a, b, c that are still open is carried out, for example, by a geometrical analysis of the layout on the ground of the sets of penetrating points 15 found in the inventory consisting in having this layout on the ground scanned by a pivoting horizontal axis rotating about the position S of the aircraft and in identifying the angular positions where the axis does not intercept any penetrating point. In the example of FIG. 4, this geometrical analysis gives three open sectors: a sector a slightly to the left of the aircraft and two sectors b and c placed laterally at the limit of the heading range covered by the analysis feeler 2.

When an imminent risk of collision with the terrain is detected, signaled by a penetration of the terrain into the limit-point feeler 1, and as such that cannot be resolved by a simple standard vertical avoidance maneuver, the open azimuth sectors found by means of the analysis feeler 2 have their aperture angles tested for their ability to model a standard vertical avoidance maneuver path that respects a lateral safety margin relative to the reliefs of the terrain being flown over, for example by imposing a minimum length on their arcs of circles at the level of their points of contact with sets of penetrating points. Then, the open azimuth sectors having satisfied the lateral margin test or, alone among them, the one requiring the minimum change of heading, are used as azimuth guidance information displayed, for example, in the form of trend bars on a head-up display HUD or primary flight display PFD displaying primary flight parameters.

Optionally, the open azimuth sector that has satisfied the lateral margin test and requires the minimum change of heading is used in selecting a composite avoidance maneuver consisting of a change-of-heading maneuver followed by a standard vertical avoidance maneuver recommended to the pilot via the flight director or directly executed by the automatic pilot.

The selected composite avoidance maneuver is the one corresponding to the heading belonging to the open azimuth sector having satisfied the lateral margin test and requiring the minimum change of heading, which is closest to the inside edge of the azimuth sector while observing the lateral safety margin with respect to the sets of penetrating points. This heading is the heading of the end of an arc of circle centered on the position S of the aircraft and of a length corresponding to the lateral safety margin plotted, towards the inside of the open azimuth sector concerned, from the first point of contact of the inside edge (on the side of the direction of progress of the aircraft) of this azimuth sector with penetrating points of the terrain being flown over.

The limit-point feelers 1 and analysis feeler 2 are advantageously complemented by alert 3 and alarm 4 feelers making it possible to supply alerts and alarms while the standard vertical avoidance maneuvers are still effective.

Figure 5:
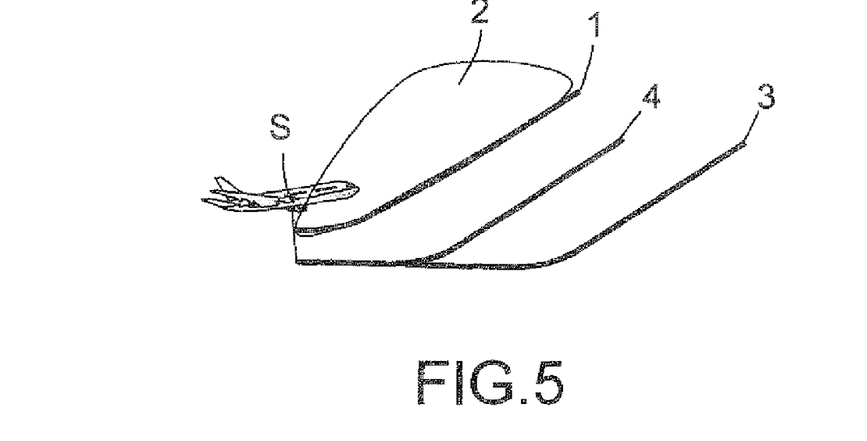
Figure 6:
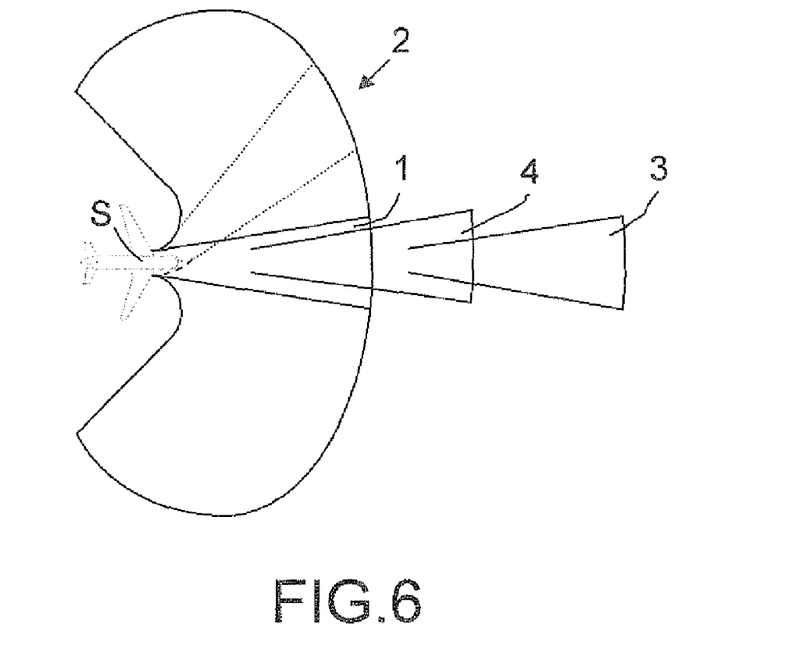

FIGS. 5 and 6 show, in vertical and horizontal projection, a combined use of the limit-point and analysis feelers 1 and 2 with two other alert and alarm feelers 3 and 4 of graduated lengths, constructed, by taking into account a vertical safety margin greater than that of the limit-point and analysis feelers 1 and 2, around a standard vertical avoidance maneuver engaged increasingly later such as those used by the operational TAWS systems to trigger their alerts and alarms. Here, the feeler 4 is used to trigger a "Pull-up" voice alarm indicating to the pilot a need to immediately engage a standard vertical avoidance maneuver whereas the feeler 3 is used to trigger a "Caution" voice alert indicating to the pilot that he must, in the short term, modify the path being followed. The alarm feeler 4 is constructed around a standard vertical avoidance maneuver engaged, not immediately as for the limit-point feeler 1, but in the very short term, to allow the pilot the reaction time needed to take account of a voice alarm. The alert feeler 3 is constructed around a standard avoidance maneuver engaged in the medium term to allow the pilot the time to analyze the situation having provoked the voice alert and decide on a path modification with which to resolve the established risk of collision with the ground.

For more details on the operational TAWS systems that use feelers to generate "Caution" voice alerts and "Pull-up" voice alarms intended for the pilot, reference can be made to the American patents U.S. Pats. Nos. 5,488,563 and 5,638,282 (Chazelle, Hunot, Lepere).

Figure 7:
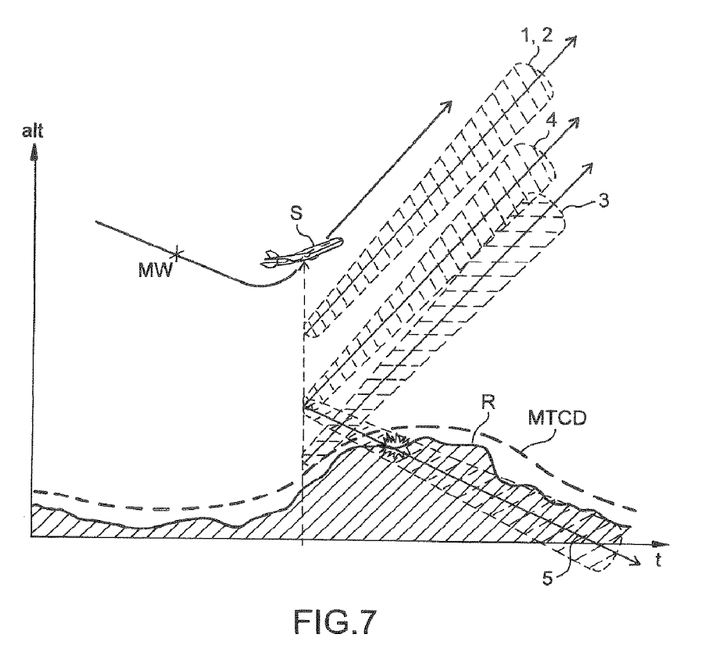
FIG. 7 shows, in vertical cross section, an association of limit-point, analysis, alert, alarm and end-of-conflict feelers.

A TAWS-type terrain collision prevention system with limit-point and analysis feelers is advantageously provided with a device for observing the resolution of a conflict with the terrain signaling the possibility for the aircraft to resume a normal path with no conflict with the terrain in the short and medium term based either on monitoring the current altitude of the aircraft and detecting a violation of this altitude by a value greater than a safety altitude, or, as shown in FIG. 7, on monitoring the elimination of any penetration of points of the terrain being flown over into a dedicated end-of-conflict feeler.

FIG. 7 shows, in a real-life situation, an aircraft which is initially descending to a point MW of its path where it is alerted by an onboard TAWS-type system to a risk of collision with the terrain, or rather with a surface MTCD covering the relief R and corresponding to a minimum safety margin that takes account of various imprecisions concerning the elevations of the terrain and concerning the measurement of the height of the aircraft above the ground. This aircraft has been alerted, by its TAWS-type system, at the point MW of its path, to a risk of collision with the terrain and has initiated a standard vertical avoidance maneuver that leads it to its current position S, on a climb path.

The onboard TAWS-type system having supplied the alert is a system for preventing collisions with the ground that implements the limit-point and analysis feelers 1 and 2 and the alert and alarm feelers 3 and 4, and a dedicated end-of-conflict feeler 5. The limit-point, analysis, alarm and alert feelers 1, 2, 3 and 4, which are flattened because of the fact that the aircraft has engaged the second part with climb gradient close to the maximum of a standard vertical avoidance maneuver, and which no longer provokes either alert or alarm because they no longer encounter any point of the terrain being flown over, inform the pilot of the good effectiveness of the standard vertical avoidance maneuver engaged, but do not inform as to the possibility or otherwise of resuming the descent maneuver that he was following before the alert or alarm concerning risk of collision with the terrain. This function is devolved to the end-of-conflict feeler 5 constructed around a hypothetical path for returning to the route resuming the initial heading of the aircraft and the gradient of its initial path or a horizontal gradient. In the situation represented, the end-of-conflict feeler 5 intercepts the surface MTCD covering the terrain being flown over, indicating that the standard vertical avoidance maneuver currently being performed must be continued before the risk of collision with the terrain can be considered to be resolved.

A TAWS-type system for preventing collisions with the terrain with limit-point and analysis feelers is advantageously provided with a device for disabling the alerts, alarms, signaling disengagement sectors and optionally implementing the automatic engagement of avoidance maneuvers as soon as the aircraft is performing an approach towards a runway (on which it intends to land) or a disengagement from a take-off runway, the runway information being obtained by the use of data contained in a database of airport runway coordinates.

This disabling device can be based on the disabling or otherwise of the alerts, alarms, signaling of disengagement sectors and optional implementation of automatic engagement of avoidance maneuvers on a criterion of presence or otherwise of the aircraft on or in the immediate vicinity of (to take account of positioning and path following inaccuracies) an authorized path for approaching or disengaging from a landing/take-off runway according to the concept commonly called "landing tunnel", described for example in the U.S. Pat. No. 6,088,654, this criterion of presence or absence in the vicinity of an approach path being able to be complemented or modified by other criteria such as selection of the approach mode for the automatic pilot of the aircraft.

Different variants can be envisaged in the embodiment of a TAWS-type system for preventing collisions with the terrain with limit-point feelers 1 and analysis feeler 2. Thus, the automatic engagement of a composite avoidance maneuver comprising a turn toward a disengagement sector followed by a standard vertical avoidance maneuver can be delayed until the remaining disengagement sectors no longer comply with certain predefined criteria such as:

occupancy of a range of headings less than, for example, 50% of the range of headings covered by the analysis feeler 2, disengagement sectors requiring a minimum change of heading of more than 25° for example, change of altitude required in the disengagement sectors to reach a higher safety altitude, for example 15000 feet.

In such variants, the analysis of the criteria for delaying the automatic engagement of a composite avoidance maneuver begins on passing the limit-point of effectiveness of a simple standard vertical avoidance maneuver.

The climb gradient taken into account in determining the paths of the standard vertical avoidance maneuvers can depend on the type of feeler concerned. Thus, for the limit-point and analysis feelers 1 and 2, it can be taken to be greater than the climb gradient adopted for the alert and alarm feelers 4 and 3, when the latter is subject to a loss of value (generally 10%) in relation to the maximum climb gradient corresponding to a safety margin.

Figure 8:
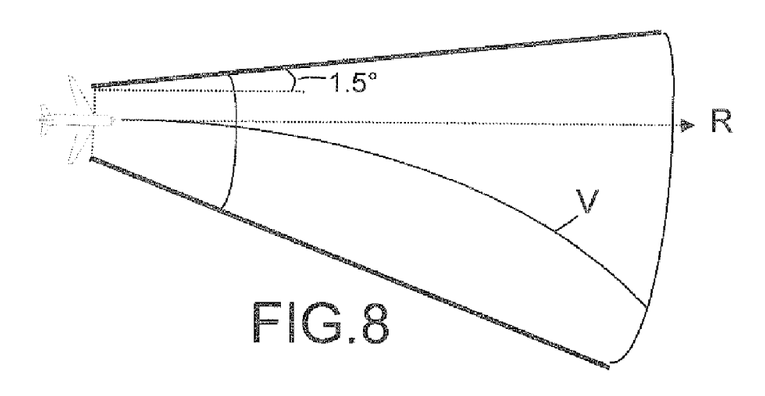
FIGS. 8, 9 and 10 illustrate, in horizontal cross-section, various forms of feelers.
Figure 9:
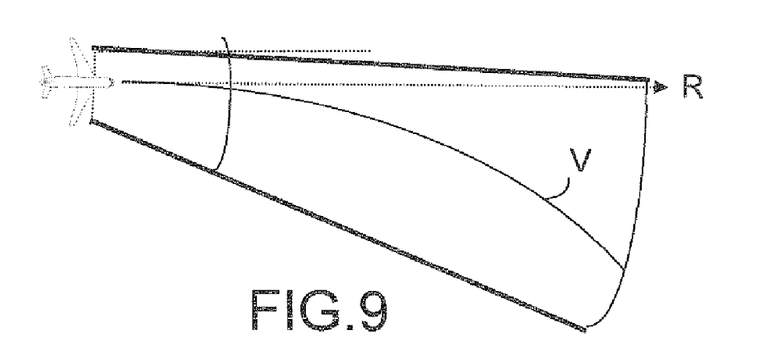
Figure 10:
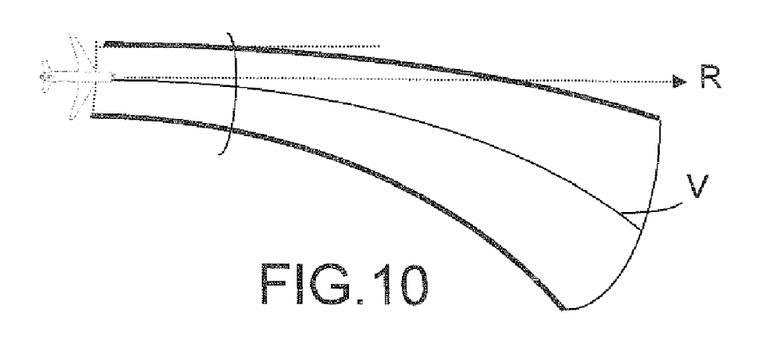

The various limit-point, alarm and alert feelers 1, 3 and 4 have been mainly described and represented in the context of an aircraft moving in a straight line, that is with shapes whose surfaces have generatrices that are movement axes with rectilinear horizontal projection. In the case of a turn movement of the aircraft, the shapes and apertures of these feelers 1, 3, 4 relative to the direction of movement of the aircraft are adapted, their generatrices becoming movement axes with curved projection corresponding to the turn and their apertures, which are of the order of 1.5° for a straight-line flight, are enlarged on the inside of the turn according to the rate of turn, the enlargement being able to reach 90°, and either maintained or reduced on the outside of the turn. FIGS. 8, 9 and 10 illustrate the different forms that follow therefrom for the horizontal projections of the feelers. In these FIGS. 8, 9, 10, the aircraft instantaneously follows an axis of route R while executing a turn of line V.

As for the analysis feeler 2, it has a shape which takes account of the local wind which reduces the apparent turn radii when it is a headwind and increases them when it is a tailwind. These apparent radii can be likened to half the distance to the points of the turns where the aircraft reaches a change of heading of 180°, points whose transverse distances in relation to the aircraft satisfy the relation:

$$x_t(t_{W1}) = WS_{Xt} \cdot t_{W1} - \delta \cdot R \cdot \cos(wt_{W1} + \gamma_t) + \delta \cdot R \cdot \cos(\gamma_t)$$

with $$t_{W1} = \frac{1}{w}\left[\arcsin\left(-\delta \frac{WS_{Xt}}{TAS}\gamma_t\right) + 2k \cdot \Pi\right]$$

$$\gamma_t = -\delta \cdot (\text{Track} - \text{Heading})$$

$$R = \frac{TAS^2}{g \cdot \tan\varphi_{roll}}$$

$$w = \frac{TAS}{R} = \frac{g \cdot \tan\varphi_{roll}}{TAS}$$

TAS being the amplitude of the air speed of the aircraft, g being the acceleration of gravity, $\varphi_{roll}$ being the roll angle of the aircraft during the maneuver, γ being a factor dependent on the initial conditions, δ being a coefficient equal to +1 for a turn to the right and −1 for a turn to the left, $WS_{Xt}$ being the local crosswind.

For a justification of this relation, reference can be made to the description of the French patent application filed by the applicant under the number 04 06652.

Figure 11:
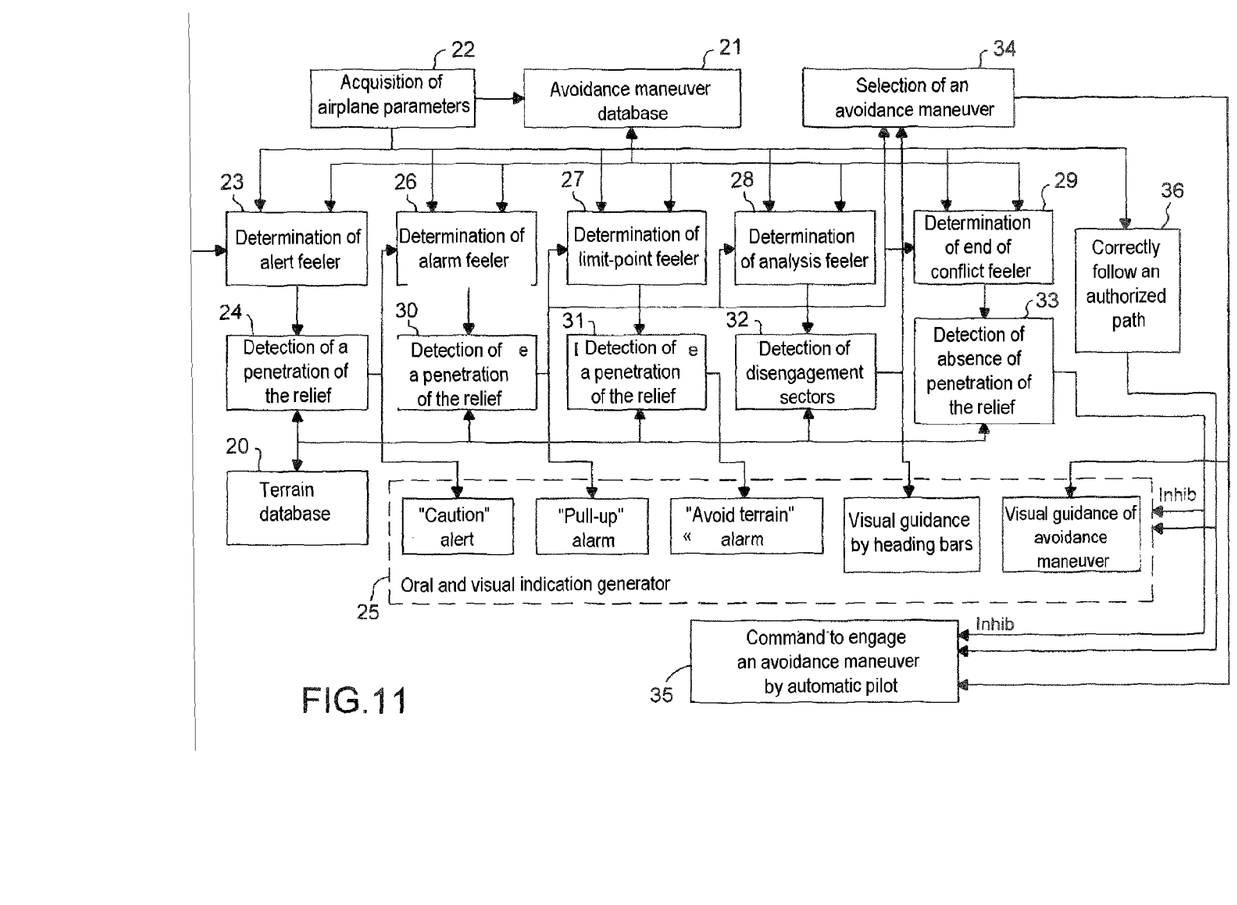
FIG. 11 illustrates a possible operation of a system for preventing collision with the terrain according to the invention.

FIG. 11 illustrates an exemplary operation of a TAWS-type system for preventing collisions with the terrain implementing the various feelers that have just been described.

This system uses a terrain elevation database 20, a database 21 of avoidance maneuvers or of airplane climb capabilities, and an airplane parameter acquisition system 22.

In the absence of a risk of collision, it generates, in 23, an alert feeler from a predetermined vertical safety margin and a medium-term extrapolation (typically around 20 seconds) of the path of the aircraft taken from the airplane parameters continued over approximately 2 minutes by a standard vertical avoidance maneuver path taken from the database 21 of avoidance maneuvers by means of the airplane parameters and, in 24, monitors a possible penetration into the alert feeler of the terrain being flown over, sampled in the terrain elevation database 20.

When a penetration of the terrain being flown over into the alert feeler is detected, it draws the attention of the pilot to the need to take into account a risk of collision with the terrain by inciting a generator 25 of oral and visual indications to issue a "caution" alert, triggers the creation of a number of complementary feelers: in 26, an alarm feeler, in 27, a limit-point feeler, in 28, an analysis feeler and in 29, an end-of-conflict feeler, monitors, in 30, 31, 32, a possible penetration of the terrain being flown over into the new alarm, limit-point and analysis feelers with, in addition, in 32, an analysis of the azimuth sectors free of penetration, and in 33, a possible end of penetration of the terrain into the end-of-conflict feeler.

The alarm and limit-point feelers are created in a way similar to that used for the alert feeler, the difference lying in the delay in extrapolating the path of the aircraft which is in the short term (typically around 5 to 8 seconds) for the alarm feeler and in the very short term for the limit-point feeler (typically less than 3 seconds) and possibly in the vertical safety margin which can have a different value for each feeler.

The scanning feeler which has wide lateral extensions uses lateral turn paths similar to arcs of circles, the radius of which depends on the airplane parameters and on the local crosswind, and continued with a standard vertical avoidance maneuver path extracted from the database 21 of avoidance maneuvers by means of the airplane parameters. It is created from generatrices starting from the position of the aircraft or from a predicted position, which are:

either direct straight lines from the position concerned in climb mode (possibly after a reaction period), or arcs of circles according to the current roll prolonged by straight line climb paths, or curved paths preceded or not by arcs of circles, in instantaneous or deferred climb mode.

The end-of-conflict feeler is created like the alert feeler, but from an extrapolation in the medium term of the path initially followed by the aircraft taken from the values of the airplane parameters fixed at the time of the detection of the risk of collision with the terrain currently being processed.

The various feelers are created in the form of surfaces in three dimensions, discretized for example in distance or in time, azimuth and/or elevation. They have a defined space-time extension over a distance or time of travel, either equivalent for all the directions, or variable according to the azimuth and, for a given direction (a generatrix) either fixed or variable depending on a criterion such as the relative height of the highest surrounding peaks. In the calculations, these surfaces can advantageously be folded out onto a plane in two dimensions.

If, in 30, a penetration of the terrain being flown over into the alarm feeler is detected, it draws the attention of the pilot to the need to immediately engage a standard vertical avoidance maneuver by inciting the generator 25 of oral and visual indications to issue a "pull-up" alarm, and possibly triggers, in 34, the identification and the selection of an avoidance maneuver for an engagement in 35 of the automatic pilot in a terrain avoidance maneuver.

If, in 31, a penetration of the terrain being flown over into the limit-point feeler is detected, it informs the pilot of the ineffectiveness of a standard vertical avoidance maneuver by inciting the generator 25 of oral and visual indications to issue an "avoid terrain" type alarm.

It evaluates, in 32, the azimuth sectors that are free of penetration of the terrain into the analysis feeler and flags them for the attention of the pilot by inciting the generator 25 of oral and visual indications to display heading bars, and triggers, in 34, the selection of an effective avoidance maneuver to indicate to the pilot via the generator 25 of oral and visual indications and, possibly in 35, for an engagement of the automatic pilot in an avoidance maneuver.

As soon as, in 33, an end-of-detection of penetration of the terrain being flown over into the end-of-conflict feeler is detected or, in 36, the fact that an authorized path is being correctly followed is observed, it disables all the alerts, alarms and avoidance maneuver advice issued by the generator 25 of oral and visual indications, possibly signals to the pilot the fact that the conflict is resolved by inciting a generator 24 of oral and visual indications to issue an end-of-alert of "end of threat" type, and leaves only the alert feeler active.

Figure 12:
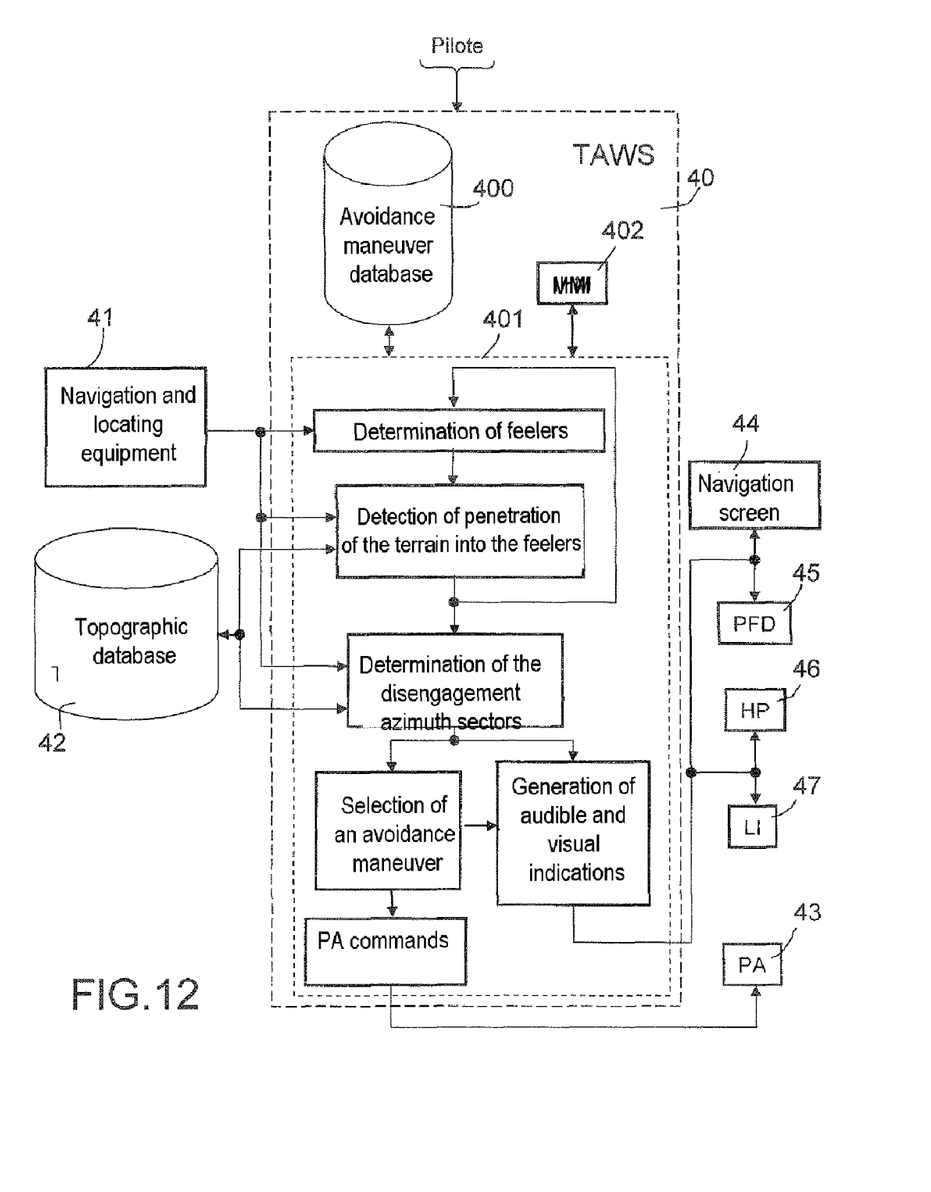
FIG. 12 illustrates the layout of a system of preventing collision with the terrain according to the invention in an aircraft environment.

As shown in FIG. 12, a TAWS-type system 40 for preventing collisions with the terrain is inserted into the equipment onboard an aircraft between:

the navigation and locating equipment 41 combining the flight instruments and a geographic locating device, such as, for example, a receiver of a satellite positioning system GNSS (Global Navigation Satellite System), possibly complemented by an inertial unit, a baro-altimeter, a radio-altimeter or a combination of several of these sensors, a terrain elevation database 42, also including data on the geographic coordinates of the airport runways, automatic piloting equipment PA 43, dashboard screens: navigation screen 44 displaying a navigation map, piloting screen 45 displaying the primary flight parameters, and alert emitters placed in the cockpit, mainly of sound or voice type 46: loudspeaker (LS), siren, buzzer, etc., but also of visual type 47: indicator lamp (LI), etc.

It mainly comprises:

a database of avoidance maneuvers or of airplane climb capabilities 400, a computer 401 using the information originating from the navigation and locating equipment 41 and from the terrain elevation and avoidance maneuver databases 42, 400, to create the various feelers: alert feeler, alarm feeler, limit-point feeler, analysis feeler, end-of-conflict feeler; detect the penetrations of the terrain being flown over into these feelers; according to the detections made, signal the associated risks of collision with the terrain through alerts and alarms, relayed in the cockpit by alert and alarm emitters 46, 47, accompanied by advice on the choice of an avoidance maneuver and, possibly, commands for automatically following an avoidance path, intended for the automatic pilot 43, and, where appropriate, a man-machine interface MMI 402, for example an MCDU (Multipurpose Control Display Unit) or an FCU (Flight Control Unit) enabling the system to be parameterized by a member of the crew of the aircraft or by a maintenance team, notably to choose or not choose an automatic engagement of an avoidance maneuver.

The computer 401 can be a computer dedicated to the TAWS-type system for preventing collisions with the terrain or a computer shared with other tasks such as flight management or the automatic pilot.

Obviously, it is possible to produce a TAWS-type system for preventing collisions with the terrain in accordance with the invention in various forms equivalent to that which has just been described which is just one example out of the many possible within the scope of those skilled in the art.

The invention claimed is:

1. A system onboard an aircraft, for preventing collisions with a terrain based on a risk of collision with the terrain after a predetermined forecast delay to the penetration of a cartographic representation of the terrain being flown over, stored in a database accessible to the aircraft, into a protection volume linked to the aircraft located relative to the terrain being flown over by means of onboard locating equipment, oriented in the direction of progress of the aircraft and configured so as to model a standard terrain vertical avoidance maneuver path engaged over the forecast delay based on the path followed by the aircraft predicted from flight information delivered by aircraft flight equipment, assuming that the aircraft maintains a current speed vector thereof with the same trend, if the aircraft is in the process of changing, said system comprising:

means for detecting a limit-point of success of a standard terrain vertical avoidance maneuver likening the crossing of the limit-point by the aircraft to the penetration of the terrain into a first protection volume linked to the aircraft and configured so as to model a standard vertical avoidance maneuver path executed without notable delay, said path being predefined according to the aircraft type;

means for determining azimuth disengagement sectors, either side of the direction of progress of the aircraft, suitable for the success of a standard terrain vertical avoidance maneuver, said means for determining azimuth disengagement sectors including means for determining a second protection volume with a larger azimuth aperture than that of the first limit-point protection volume, linked to the aircraft and configured so as to contain the first limit-point protection volume and, for the various azimuths covered, paths of a composite maneuver beginning with change-of-heading maneuvers with which to reach the azimuth concerned and continuing with the standard terrain vertical avoidance maneuver, said paths being, over parts corresponding to the standard vertical avoidance maneuver, predefined according to the aircraft type, and means for determining penetration of the terrain into the protection volume, wherein the azimuth disengagement sectors are free of penetration of the terrain into said first protection volume;

means for signaling the crossing of the limit-point of success of the standard terrain vertical avoidance maneuver; and means for signaling the azimuth disengagement sectors.

2. The system as claimed in claim 1, wherein a predefined path corresponding to a standard vertical avoidance maneuver is dependent on the weight of the aircraft.

3. The system as claimed in claim 1, wherein a predefined path corresponding to a standard vertical avoidance maneuver is dependent on the inertia of the aircraft.

4. The system as claimed in claim 1, wherein a predefined path corresponding to a standard vertical avoidance maneuver is dependent on the aircraft configuration of the moment.

5. The system as claimed in claim 1, further comprising means for signaling a composite terrain avoidance maneuver with minimal change of heading.

6. The system as claimed in claim 1, further comprising means for guiding the crew of the aircraft in executing a composite terrain avoidance maneuver.

7. The system as claimed in claim 1, further comprising means for automatically executing a composite terrain avoidance maneuver directly affecting the aircraft flight equipment.

8. The system as claimed in claim 1, further comprising means for alerting to a medium-term risk of collision with the terrain involving, to be resolved, a change of path of the aircraft, on the part of the crew, likening a collision with the terrain to the penetration of the terrain into an alert protection volume linked to the aircraft modeling a predefined standard vertical avoidance maneuver path engaged in the medium term.

9. The system as claimed in claim 1, further comprising means for raising an alarm concerning a short-term risk of collision with the terrain likening a short-term collision with the terrain to the penetration of the terrain into an alarm protection volume linked to the aircraft modeling a predefined standard vertical avoidance maneuver path engaged in the short term.

10. The system as claimed in claim 8, further comprising alert and/or alarm means for concerning the medium-term risk of collision with the terrain, wherein the second protection volume linked to the aircraft is configured to determine the disengagement sectors, and the alert protection volume linked to the aircraft is configured to alert model predefined standard avoidance maneuver paths of different types, the predefined path modeled in the protection volume to determine disengagement sectors having a climb gradient greater than the predefined paths modeled in the alert protection volume.

11. The system as claimed in claim 9, further comprising alert and/or alarm means concerning the short-term risk of collision with the terrain, wherein the second protection volume linked to the aircraft is configured to determine the disengagement sectors, and the alarm protection volume linked to the aircraft is configured to alarm model predefined standard avoidance maneuver paths of different types, the predefined path modeled in the protection volume to determine disengagement sectors having a climb gradient greater than the predefined paths modeled in the alarm protection volume.

\* \* \* \* \*